Oct. 6, 1931.    H. M. HESSENBRUCH    1,826,663
LAWN MOWER
Filed May 22, 1930    2 Sheets-Sheet 2
FIG. II.
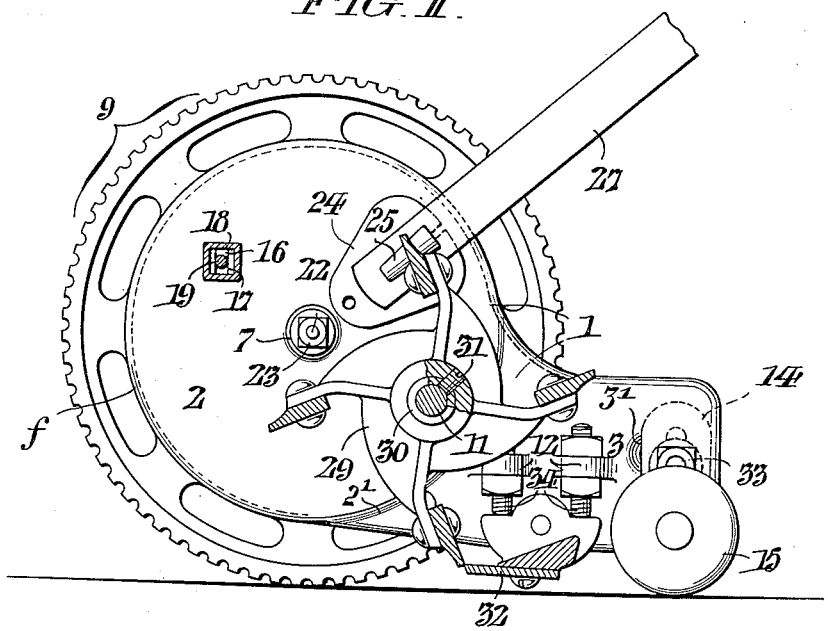
FIG. III.
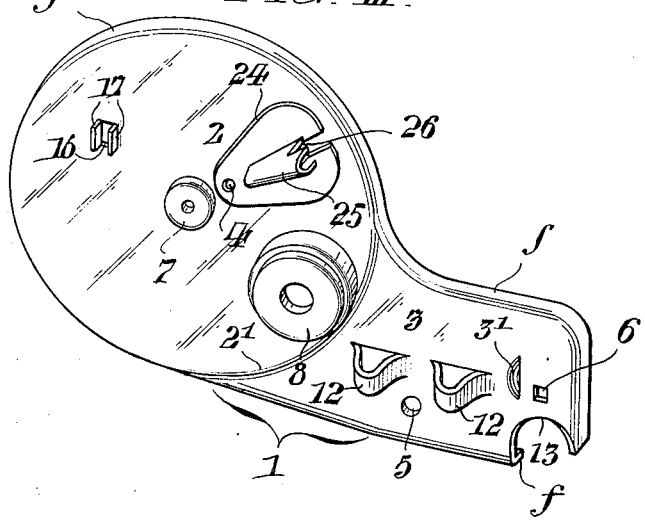
WITNESSES
John A. Weidler
Hubert Kuhn
INVENTOR:
Hermann M. Hessenbruch,
BY Fraley Paul
ATTORNEYS.

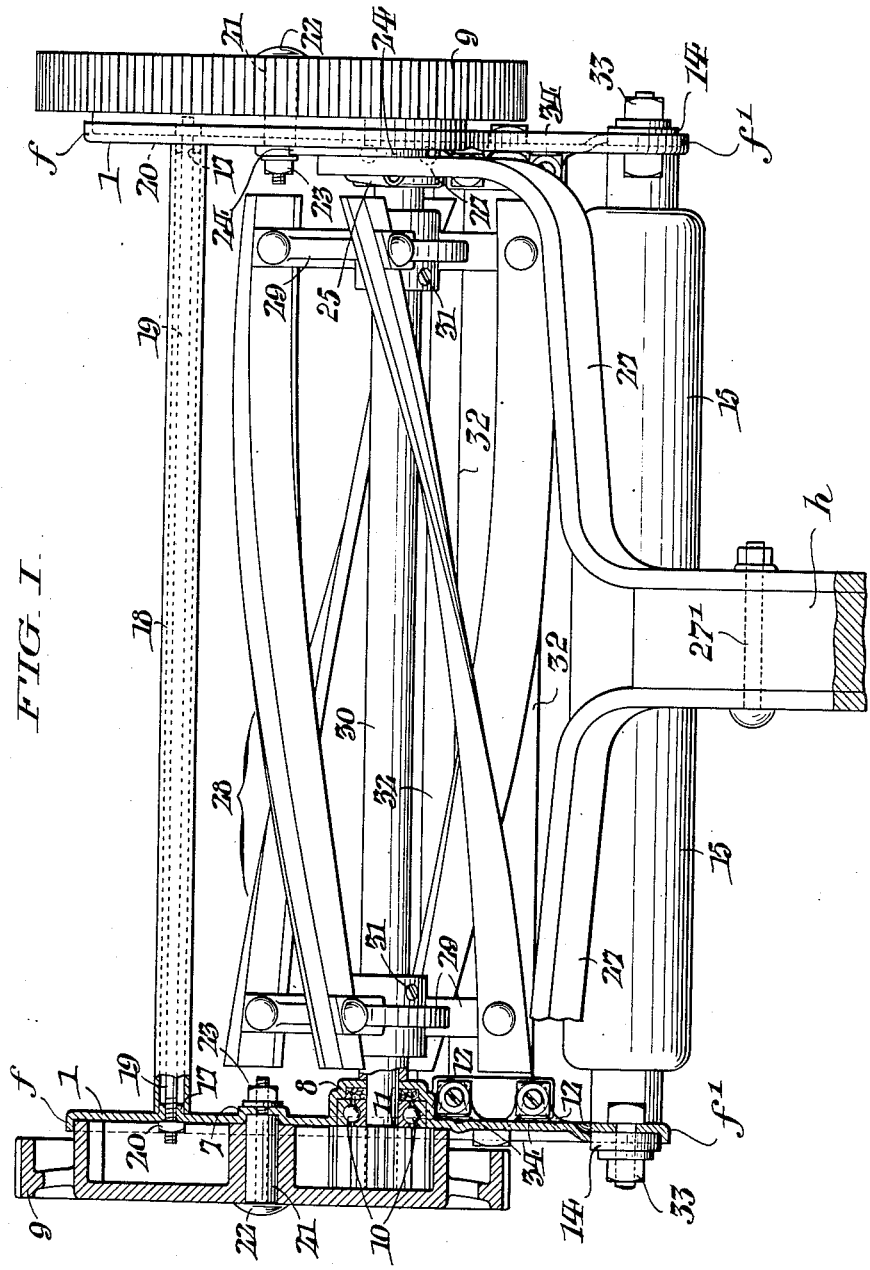

Patented Oct. 6, 1931

1,826,663

UNITED STATES PATENT OFFICE

HERMANN M. HESSENBRUCH, OF WYNNEWOOD, PENNSYLVANIA, ASSIGNOR TO PHILADELPHIA LAWN MOWER COMPANY INC., OF PHILADELPHIA, PENNSYLVANIA, A CORPORATION OF PENNSYLVANIA

LAWN MOWER

Application filed May 22, 1930. Serial No. 454,635.

This invention relates to lawn mowers and more particularly to the type including symmetrical side plates connected together in parallel relation by means of a "shrub" bar or girth made from a solid piece of material, said bar or girth having provisions whereby the side plates are secured thereto. An objection to such manner of securing the side plates together is that, unless great care is exercised, it is almost impossible to secure said plates in true alignment; thereby causing trouble in fitting and assembling the associated mechanism.

The primary object of this invention is to provide a lawn mower in which the side plates embody novel features whereby accuracy in assembly and correct alignment of the respective parts is positively ensured.

Another object is to provide an improved form of side plate for lawn mowers embodying novel features which facilitate expeditious removal of the rotary cutter for renewal, or other purposes, without separating the side plates; novel means affording guidance for the back roller supporting elements; and integral abutment loops for steadying the stationary knife adjuster screws.

A further object is to provide a lawn mower frame construction including novel means for connection of the handle brace.

With the stated objects in view, together with others which will appear as this description proceeds, my invention resides in the novel formation, combination and arrangement of parts, all as will be described more fully hereinafter, shown by the accompanying drawings, and particularly specified in the claims.

In the drawings:

Fig. I is a top plan view of my improved lawn mower with parts in section better to disclose certain of the novel features.

Fig. II is a transverse sectional view of the same; and,

Fig. III is a perspective view looking toward the inner face of one the side plates.

Referring more in detail to the several illustrations, the frame of my improved lawn mower comprises counterpart side plates, comprehensively designated 1; each of which, as best appreciated from Fig. III, is conveniently, although not essentially, stamped out of sheet metal to embody a circular portion 2 with a co-planar substantially rectangular extension 3; said parts being reinforced and stiffened by an arcuate grooving or indentation 2' setting apart the circular portion, and a surrounding flange or lip $f$. During the course of fabrication each side plate 1 is suitably pierced, as by punching or otherwise, to provide a series of holes 4, 5 and 6, for purposes later on explained; as well as a concentric apertured embossment 7, and an eccentric embossment 8; the former of which 7 constitutes a bearing for one of the ground wheels 9, while the latter 8 affords a housing for a bearing 10 for one end of the rotary cutter shaft 11.

Each side plate 1 is also provided with a pair of laterally-directed integral abutment loops 12 conveniently expanded out therefrom; while the terminal end of the portion 3 is notched at 13 to constitute guide means, in conjunction with the vertical flanged edge $f'$ and a paralleling segmental offset 3', for the slotted supporting element 14 and back roller 15.

In addition to the foregoing, I punch an angular hole or orifice 16, square for example, through each side plate 1, and expand edges thereof in the form of paralleling flanges or lugs 17. Fitting over these flanges or lugs 17 is a length of square-section tubing 18 which constitutes the girth or brace bar between the opposing side plates 1, said plates being secured together through the medium of a tie rod 19 having screw-threaded ends for reception of clamp nuts 20. In this manner, it will be apparent, it becomes absolutely impossible for anyone, whether skilled or not, to secure the opposing side plates 1 together without having them in true alignment.

Referring to the concentric apertured embossment 7, I fit thereinto a piece of round tubing 21, and hold the same in place by means of a bolt 22 having a lock washer and nut 23; said tubing serving as a bearing sleeve for the ground wheel 9. The advantage of such a construction is that provision is made whereby the easy removal of the wheel bearing sleeves 21 can be readily effected and replacements made when said bearings become worn.

Secured to each side plate 1, as by welding or otherwise, is a stamping 24 having an outstanding tongue or lug 25 with a latching notch 26; said stamping being properly centered and retained against rotation relative to the side plate 1, during process of fixture thereto, by inserting a pin or the like through the hole 4, hereinbefore referred to, into a corresponding hole in the stamping 24, in an obvious manner. The tongue or lug 25 with its latching notch 26 jointly afford connection for the handle braces 27, when secured to the handle $h$ by bolts 27', one only being shown, all of which will be readily understood by those acquainted with the art. This manner of connecting the handle braces 27 to the side plates 1, affords a simple and effective means of attachment, while at the same time it is of a character not liable to work loose; or, the latching tongue 25 to become fractured or be broken off.

Referring now to the rotary cutter or reel 28, it will be seen that the spiders 29 thereof are securely mounted on a tube 30 fitted on the hereinbefore referred to cutter shaft 11, said parts being connected together by one or more set screws 31 threadedly engaged through one or both of the bosses of the spiders 29. Now, it will be readily apparent that by loosening or backing up the set screw or screws 31, the shaft 11 can be easily withdrawn and a fresh cutter or reel 28 applied to the mower without disconnection of the side plates 1.

The holes 5 afford pivot bearing for the stationary knife 32; the holes 6 for passage of the squared shank ends beneath the heads of the clamp bolts 33 that secure the back roller supporting elements 14 in position; while the lateral abutment loops 12 accommodate the stationary knife adjuster screws 34; all in the known way.

From the foregoing it is thought my invention will be readily understood, while the economical aspects thereof are obviously apparent; hence I reserve the right to such detail changes as may be warranted in view of prior art and the scope of the following claims permits.

Having thus described my invention, what I claim is:—

1. In a lawn mower, a pair of complemental side members each embodying an angular aperture with a lateral lug, an angular section element co-active with the lugs to align the side members, and means securing said members and element together.

2. In a lawn mower, a pair of counterpart frame components each embodying a rectangular aperture with spaced lateral lugs, a rectangular section hollow element co-acting with such lugs to correctly align the frame components, and means securing said parts rigidly together.

3. In a lawn mower, a pair of counterpart side plates each embodying a square aperture with parallel lateral lugs, a square section tube engaging at its ends over such lugs to alignedly brace the side plates, and a tie rod concentric of the brace tube with means for securing said parts rigidly together.

4. In a lawn mower, a pair of counterpart side plates each embodying an aperture of angular contour with parallel lateral lugs and a cupped embossment, an angular-section tube co-operative with the lateral lugs to correctly align the side plates, means clamping the side plates and tube rigidly together, a bearing sleeve seating in each cupped embossment for a ground wheel, and means securing said sleeves to the side plates while affording rotative guidance for the ground wheels.

5. In a lawn mower, a pair of counterpart side plates each embodying an angular aperture with parallel lateral lugs and a plurality of cupped apertured embossments, an angular-section tubular brace co-acting with the lateral lugs to correctly align the side plates, a tie rod through the tubular brace rigidly clamping the side plates and brace together, bearing sleeves in aligned cupped embossments for the ground wheels, bolts securely clamping said sleeves in position while affording rotative guidance for the ground wheels, a rotary cutter shaft, bearings in the other opposing cupped embossments for said rotary cutter shaft, and means whereby the cutter shaft may be withdrawn without separating the side plates aforesaid.

6. In a lawn mower, a pair of counterpart side plates each embodying a rectangular aperture with lateral lugs and a plurality of cupped apertured embossments, a rectangular-section tubular brace co-acting with the lateral lugs to correctly align the side plates, a tie rod through the tubular brace rigidly clamping the side plates and brace together, bearing sleeves in opposing cupped embossments for the ground wheels, bolts securely clamping said sleeves in position while affording rotative guidance for the ground wheels, a rotary cutter shaft, bearings in the other opposing cupped embossments for said rotary cutter shaft, a coaxial tube, and means attaching said tube to the cutter shaft whereby the latter may be withdrawn without separating the side plates.

7. In a lawn mower, counterpart side plates each embodying a rectangular aperture having opposed lateral lugs and a pair of differently cupped apertured embossments, a rectangular-section tubular brace co-acting with the lateral lugs to correctly align the side plates, a tie rod through the brace to rigidly clamp the latter and the side plates together, bearing sleeves in opposing cupped embossments for support of the ground wheels, bolts securing said sleeves in position, lateral latch elements on the side plates for connection of the mower handle braces, a rotary cutter shaft, bearings in the other opposing cupped embossments for the rotary cutter shaft, a co-axial tube fitting the cutter shaft, and means attaching said tube and shaft together with capacity for withdrawal of the latter when renewal of the cutter is necessary without disconnecting the side plates aforesaid.

In testimony whereof, I have hereunto signed my name at Philadelphia, Pennsylvania, this 15th day of May, 1930.

HERMANN M. HESSENBRUCH.